United States Patent [19]
Ostwald et al.

[11] Patent Number: 5,336,030
[45] Date of Patent: Aug. 9, 1994

[54] BUFFERED ACCESS SYSTEM FOR AN AUTOMATED COMPUTER MEDIA STORAGE LIBRARY

[75] Inventors: Timothy C. Ostwald, Louisville; David T. Hoge, West Minster, both of Colo.

[73] Assignee: Storage Technology Corporation, Louisville, Colo.

[21] Appl. No.: 31,896

[22] Filed: Mar. 16, 1993

[51] Int. Cl.$^5$ ............................................. B65G 1/06
[52] U.S. Cl. .................................................. 414/277
[58] Field of Search ........ 414/273, 277, 280, 267–270, 414/797.4, 792.7; 360/92; 369/35-39

[56] References Cited

U.S. PATENT DOCUMENTS

| | | | |
|---|---|---|---|
| 3,964,577 | 6/1976 | Bengtsson | 414/280 X |
| 4,067,459 | 1/1978 | Rozengauz et al. | 414/269 |
| 4,546,901 | 10/1985 | Buttarazzi | 414/280 X |
| 4,835,634 | 5/1989 | Ostwald | 360/92 |
| 4,844,679 | 7/1989 | Teranishi | 414/280 X |
| 4,864,511 | 9/1989 | Moy et al. | 364/478 |
| 4,908,777 | 3/1990 | Wolfe | 364/513 |
| 4,932,826 | 6/1990 | Moy et al. | 414/277 |
| 4,937,690 | 6/1990 | Yamashita et al. | 360/92 |
| 5,034,904 | 7/1991 | Moy | 364/571.04 |
| 5,128,816 | 7/1992 | Imazaike | 360/92 |
| 5,128,817 | 7/1992 | Herger et al. | 360/92 |
| 5,139,384 | 8/1992 | Tuttobene | 414/277 X |
| 5,143,193 | 9/1992 | Geraci | 414/277 X |

FOREIGN PATENT DOCUMENTS

| | | | |
|---|---|---|---|
| 127506 | 6/1986 | Japan | 414/277 |
| 147606 | 6/1991 | Japan | 414/277 |
| 116001 | 4/1992 | Japan | 414/270 |

Primary Examiner—David A. Bucci
Attorney, Agent, or Firm—Sterne, Kessler, Goldstein & Fox

[57] ABSTRACT

A buffered access system for loading and unloading media from a storage library system without interfering with the operation of the robotic arm within the storage library, while maintaining the security and integrity of the system, and increasing the overall storage capacity of the storage library. The buffered access system includes an automatic stack loader coupled to the exterior of the library module enabling the operator to stack multiple data cartridges to be input into the library module and to remove data storage cartridges automatically stacked in an output tray. The automatic stack loader retrieves and inserts the data storage cartridges in sequence from and into the library module through a cartridge access port to a turntable mechanism located in the interior of the library module. The turntable mechanism has a rotating platform which holds the data storage media cartridge to be transferred and is positioned by a servo motor to be properly aligned the cartridge with the automatic stack loader or robotic arm. The automatic stack loader and turntable mechanism are controlled by a library control unit which drives the two devices to operate together with the robot arm to transfer a data storage media cartridge between the automatic stack loader to a storage cell or other device within the library module.

20 Claims, 13 Drawing Sheets

BUFFERED ACCESS SYSTEM FOR AN AUTOMATED COMPUTER MEDIA STORAGE LIBRARY

BACKGROUND OF THE INVENTION

1. Field of the Invention

This invention relates generally to automated library systems and, more particularly, to an automated data cartridge storage library system that includes a buffered access system for automatically loading and unloading data storage cartridges.

2. Related Art

The computer and information industry has evolved to the point where it is necessary and desirable to have a computer facility operate without human operators. Typically, an automated storage library system has been used to store and retrieve data with a robotic media-handling device. These automated library systems typically have library modules with a magnetic tape cartridge capacity of approximately 6,000 cartridges. As a result, there is a continual need to feed or retrieve the magnetic tape cartridges from the library system.

One conventional technique used to load and unload magnetic tape cartridges from a storage library is to configure the storage library with a door to enable an operator to physically enter the device. This enables the operator to climb into the storage library to manually load and unload the cartridges. To provide the operator safe access, the operation of the automated system must be stopped, and all production ceased. In addition, the operator must carry up to 6,000 cartridges through the door and sequentially place each one into its individual storage cell.

One drawback to this approach is that it reduces the operating time of the storage library by the loading/unloading time. In addition, this technique reduces the system integrity due to the high potential for errors associated with the manual placement of cartridges in their respective storage cells. Also, providing operator access to the entire storage library beyond that needed to load/unload particular cartridges reduces the security of the system.

Another conventional technique is to implement a smaller access port which consists of a bank of cartridge slots (cells) mounted to a panel which rotates out from inside the storage area to present itself to the operator on the outside of the library module. This technique does not impact the operational time of the device since the robot mechanism does not have to be stopped during the loading/unloading process. However, this technique is timely since the loading module must be opened and closed 100 to 200 times, depending on the number of data storage cartridges held by the panel, to accomplish a full capacity load. In addition, the storage capacity of the library module is reduced by the number of fixed storage cells replaced by the panel. Lastly, each of the panels have to be monitored with sensing hardware to prevent the robot mechanism from accessing the storage cells on a panel while it is in the open position. An example of a storage library implementing such a technique is described in U.S. Pat. No. 4,779,151 to Lind, et al.

A third conventional solution is to implement the storage library with fixed pass-thru panels which enable the operator to pass the cartridges to the interior of the library module in a manner similar to a post office box. In such a system, the cartridges could be loaded and unloaded from the outside of the library module at any time while the robot arm simultaneously accesses the storage cells from the interior of the storage library.

The technique does not require the storage library to stop operation. However, the cartridge identification labels have to face the inside of the storage library so that the robot visual system can scan them. This enables the library module to catalog the cartridges and establish its database. As a result, the cartridge ID labels are unreadable to an operator accessing the storage cells from the opposite side. Furthermore, to prevent the cartridges from sliding out of their storage cells, a latching mechanism has to be employed to hold the cartridges when the outside panel is opened. Lastly, this technique drastically reduces system integrity due to the manual access of the cartridges.

What is needed is a system and method for automatically loading and unloading media from a storage library without human intervention and without interfering with the operation of the robotic arm. The system also needs to maintain system integrity and security, while not decreasing the overall storage capacity of the library system.

SUMMARY OF THE INVENTION

The present invention is a buffered access system for supplying a constant flow of cartridges to a storage library system. This buffered system establishes an efficient flow of cartridges by separating the operator duty time fluctuations from the robot duty time fluctuations. The present invention includes an automatic stack loader coupled to the exterior of the library module. The stack loader enables the operator to insert and retrieve stacks of data storage cartridges into and out of the storage library. It also includes an opening in the exterior wall proximately located to the stack loader. This provides the stack loader with a means for sequentially loading and unloading the data storage cartridges without giving the operator access to the interior of the library system. The present invention also includes a turntable mechanism located on the inside of the storage library which receives the data storage cartridges from the stack loader, reposition the cartridge, and provides it to the robot mechanism. The turntable reposition the cartridge by rotating a platform which holds the data storage cartridge. This rotation is caused by a servo motor.

The stack loader and turntable mechanism are controlled by a library control unit. The library control unit drives the two devices to operate together and automatically with the robot arm to transfer a data storage cartridge between the stack loader to a storage cell or other device within the library module.

Further features and advantages of the present invention, as well as the structure and operation of various embodiments of the present invention, are described in detail below with reference to the accompanying drawings. In the drawings, like reference numbers indicate identical or functionally similarly elements. Additionally, the left-most digit of a reference number identifies the drawing in which the reference number first appears.

BRIEF DESCRIPTION OF THE DRAWINGS

The present invention will be described with reference to the accompanying drawings, wherein.

DETAILED DESCRIPTION OF THE PREFERRED EMBODIMENTS

I. System Overview

Figure 1:
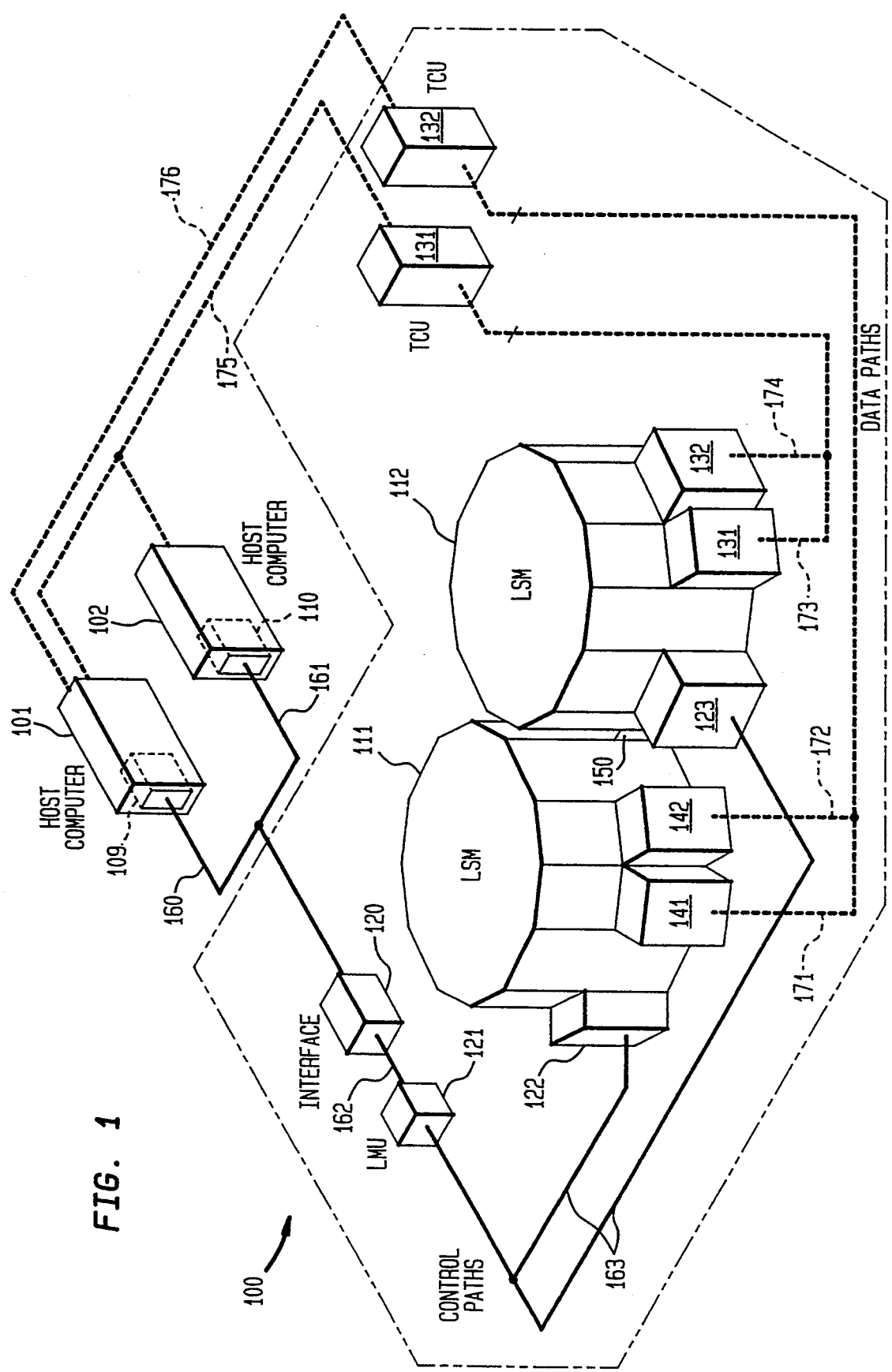
FIG. 1 is a block diagram of the automated magnetic tape cartridge library system.

Referring to FIG. 1, a block diagram of an automated data storage media cartridge library system 100 utilizing the present invention is illustrated. The automated data storage media cartridge library system ("Library System") 100 is implemented in the Automated Cartridge System (ACS), manufactured by Storage Technology Corporation, Louisville, Colo., U.S.A., and is fully described in U.S. Pat. Nos. 4,864,511 and 4,928,245 to Moy et al., incorporated herein by reference in their entirety. A plurality of host computers 101, 102 are shown connected to the automated data storage media library system 100 by means of two types of paths: control paths (illustrated by solid lines) and data paths (illustrated by dashed lines). Control paths 160, 161 and data paths 175, 176 are described in more detail below. A plurality (up to 16) of host computers can be interconnected to the automated data storage media cartridge library system 100, but only two host computers 101 and 102 are illustrated for simplicity.

The library system 100 consists of a plurality of elements. Among these elements are included two automated data storage media cartridge library modules ("library modules") 111 and 112. Library modules 111 and 112 each store a plurality of data storage media cartridges (not shown), such as 18 track magnetic tape cartridges of the IBM 3480 type for use by host computers 101, 102. Automated data storage media cartridge library system 100 may contain up to 16 library modules, but only two library modules 111 and 112 are illustrated for simplicity.

Each of the library modules 111 and 112 stores up to 6,000 of the data storage media cartridges and contains a robot arm system that functions to retrieve and return the data storage media cartridges from media cartridge storage cells contained in the library module. After retrieving the data storage media cartridges, the robot arm system loads the cartridges on media drive systems shown in FIG. 1 as a plurality of elements 141–144 attached to each of library modules 111, 112.

In the preferred embodiment, the invention is implemented in the environment of a library system which stores information on magnetic tape media in a cartridge format. However, as would be apparent to a person skilled in the relevant art, any type of storage media may be used in the present invention (for example, magnetic disk, optical disk, optical tape, etc.). In addition, in the preferred embodiment of the present invention, media drive systems 141–144 are half-inch tape cartridge drives compatible with IBM 3480 computer systems such as STK 4480 tape drives, manufactured by Storage Technology Corporation, Louisville, Colo., U.S.A. However, it should be understood that any corresponding media drive can be used to embody this invention. In addition, multiple types of information storage volumes and corresponding media drives may be used in the library system 100.

A system of control elements 120, 121, 122, and 123 are illustrated in FIG. 1 connected between host computers 101, 102 and each library module 111 and 112. The control elements illustrated in FIG. 1 operate to control the robot arm mechanism in each of the library modules 111 and 112. Each of these control elements will be described in detail below with reference to the overall operation of the library system 100. In the discussion below, reference to a single host computer, host computer 101 will be discussed for simplicity. In operation, a user operating host computer 101 requests access to data stored in a designated magnetic tape cartridge which is stored in, for example, library module 111. Host computer 101 translates the request for this data into an operator console tape mount request message. Tape cartridge library software 109 and 110 reside on host computers 101 and 102, respectively. Tape cartridge library software 109 and 110 function to interface the library system 100 in transparent fashion to host computers 101 and 102. In this example, this function is accomplished by tape cartridge library software 109 which traps operator console messages from host computer 101 and converts these console messages into magnetic tape cartridge retrieval commands. These magnetic tape cartridge retrieval commands are then transmitted via control path 162 to library management unit (LMU) 121 through interface unit 120.

Tape and cartridge library software 109 contains a database that provides the translation between magnetic tape cartridge volume records and the tape mount request operator console messages from host computer 101. Thus, a data retrieval request from host computer 101 is intercepted by tape cartridge library software 109 and used to scan the tape volume records to identify the exact physical location of the requested magnetic tape cartridge. Tape cartridge library software 109 determines the exact physical location of the requested magnetic tape cartridge in one of the library modules 111 and 112, the availability of one of the tape drives 141–144, and the identity of the library module that contains the requested magnetic tape cartridge. Tape cartridge library software 109 then transmits control signals over control path 160 via interface control unit 120 and data link 162 to library management unit 121 to identify the location of the requested magnetic tape cartridge and the exact location of the destination tape drive.

Library management unit 121 responds to the control signals from tape cartridge library software 109 by determining a path assignment from the tape cartridge storage cell which contains the requested magnetic tape cartridge to the designated tape drive. In this example, the requested magnetic tape cartridge is library module 111, and the selective cartridge tape drive unit is tape drive 144, which is attached to library module 112. The library management unit 121 designates all of the functional steps to be taken by library modules 111 and 112 to effectuate the transfer of the requested magnetic tape cartridge from the tape cartridge storage cell located in library module 111 to the selected tape drive unit 144 located on library module 112. These control signals are transmitted via control paths 160–163 to library control units 122 and 123.

Library management unit 121 transmits control signals over control path 163 to library control unit 122 to identify the exact physical location of the requested magnetic tape cartridge. The robot arm mechanism in library module 111 is controlled by library control unit 122 which translates the control signals received from library management unit 121 into servo control signals to regulate the operation of the various servo systems of the robot arm mechanism in library module 111. Library control unit 122 causes the robot arm in library module 111 to retrieve or return the requested magnetic tape cartridge from a specific tape cartridge storage cell or media drive system in library module 111.

The retrieved magnetic tape cartridge may be transported by the robot arm in library module 111 to library module 112 by way of a pass-thru port 150. The pass-thru port 150 is a mechanism that interconnects two library modules and enables adjacent library modules to pass retrieved magnetic tape cartridges back and forth between the library modules for loading on a designated tape drive or for returning to the tape cartridge storage array.

In response to control signals from library control unit 122, the pass-thru port mechanism 150 interconnects library module 111 with library module 112. The robot arm mechanism in library module 111, in response to the control signals from library control unit 122, places the retrieved magnetic tape cartridge in the reserved slot of pass-thru port mechanism 150. Upon the completion of the tape retrieval operation by library module 111, library management unit 121 transmits control signals on control path 163 to library control unit 122 to activate pass-thru port mechanism 150. The control signals instruct pass-thru port mechanism 150 to transport the retrieved magnetic tape cartridge to face the robot arm mechanism in library module 112. Library management unit 121 then transmits control signals on control path 163 to library control unit 123. Library control unit 123 responds to these control signals by generating servo control signals to regulate the operation of the robot arm mechanism. These control signals cause the robot arm mechanism in library module 112 to retrieve the magnetic tape cartridge placed in pass-thru port mechanism 150 by the robot arm in library module 111. The magnetic tape cartridge is then placed by the robot arm and the tape drive 144 as designated by library management unit 121.

The library system 100 contains independent data paths which are isolated from the control paths described above. The components which are associated with the reading and transmitting of data from the library modules 111 and 112 to the host computers 101 and 102 include tape drive units 141–144, data paths 171–174, tape control units (TCUs) 131, 132 and data links 175, 176. Each of these components will be described in detail below with reference to the data retrieval and transmission operation of the library system 100.

In the example above, the retrieved magnetic tape cartridge is loaded onto tape drive 144 where it is read in the usual fashion. Tape drive 144 then transmits the data on data path 174 to tape control unit 131. The data from tape drives 143 and 144 are multiplexed together in tape control unit 131 and transmitted over data link 175 to host computers 101 and 102. The data from tape drives 141 and 142 are multiplexed together in tape control unit 132 and transmitted over data link 176 to host computers 101 and 102. Thus, the data which is read from the retrieved magnetic tape cartridge and tape drive 144 are transmitted from tape drive 144 through tape control unit 131 to host computer 101 without the library modules 111 and 112 being aware of the destination of data.

In this fashion, a data retrieval request from a host computer is translated into the identification of a designated magnetic tape cartridge. This magnetic tape cartridge is automatically retrieved from its storage rack and transported to a library module that contains an available tape drive. That library module then loads the retrieved magnetic tape cartridge into the tape drive where it can be read and the data transmitted to the requesting host computer.

II. Library Module

A. Library Module Structure

Figure 2:
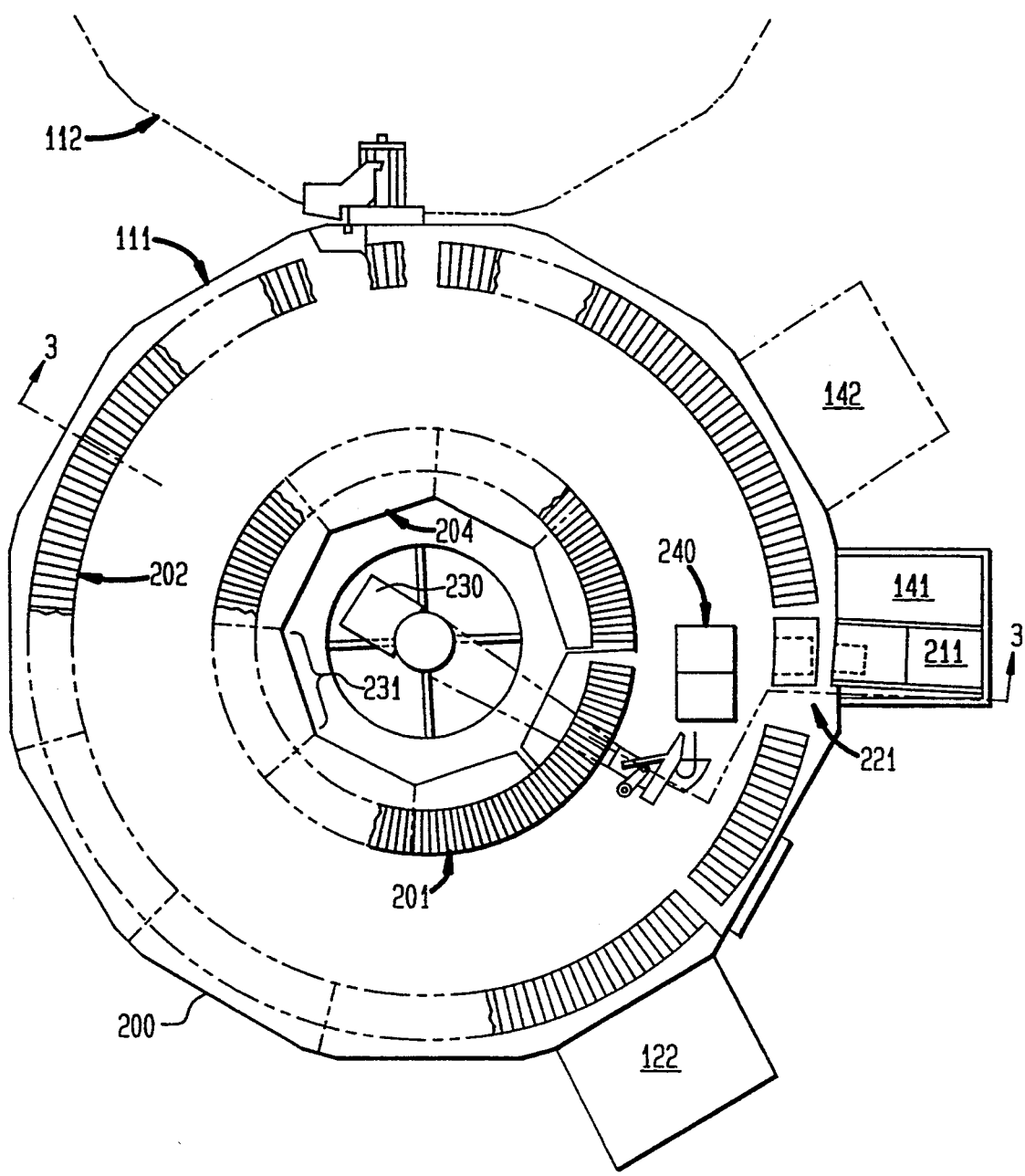
FIG. 2 is a top view of the automated tape cartridge library module.
Figure 3:
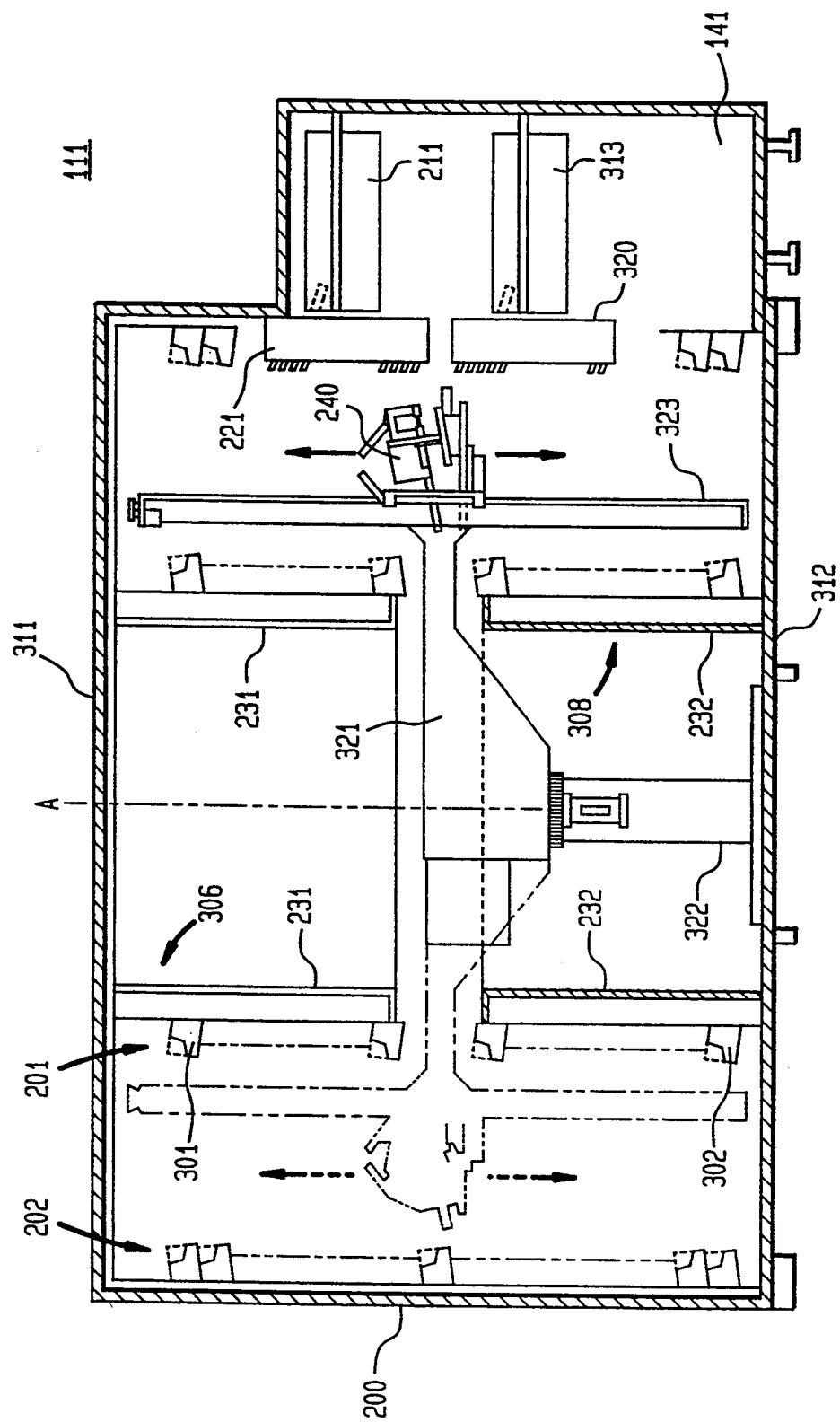
FIG. 3 is a cut away side view of the library module with its associated robotic arm assembly and tape cartridge storage array.

Referring to FIG. 2, a top view of library module 111 utilizing the present invention is illustrated. FIG. 3 illustrates a cut away side perspective view of the library module 111. The library module 111 is comprised generally of an exterior housing 200 which includes a plurality of wall segments 221 attached to floor plate 312 and ceiling plate 311, and disposed about a vertical axis A. Library module 111 also contains an inner wall 204 having an upper portion 306 which is suspended from ceiling plate 311 and a lower portion 308 which is mounted upon floor plate 312. The upper portion 306 is comprised of a plurality of upper segments 231 and the lower portion 308 is comprised of a plurality of lower segments 232.

The upper portion 306 and the lower portion 308 of inner wall 204 support an internal cylindrical array 201 of tape cartridge storage cells centered about the vertical axis A. An external cylindrical array 202 of tape cartridge storage cells is concentrically arranged about the internal cylindrical array 201 and mounted on the wall segments 221 of the exterior housing 200. The twelve-sided arrangement of the library modules 111, 112 provides great flexibility in configuring both the tape drive units as well as configuring a plurality of library modules in a juxtaposed arrangement.

B. Tape Cartridge Storage Cells

Figure 4:
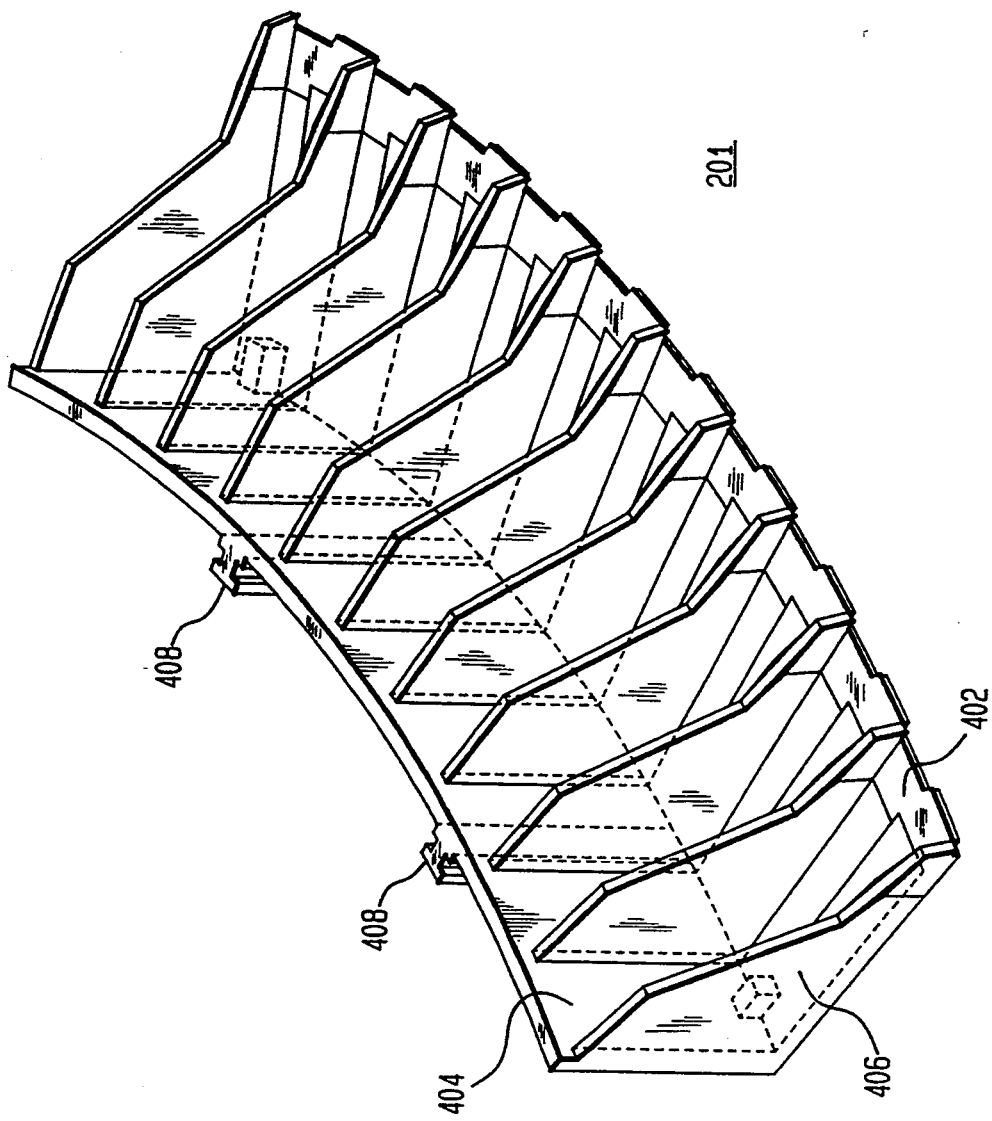
FIG. 4 is a perspective view of the tape cartridge storage cells.

Library module 111 contains two concentrically-arranged cylindrical arrays of tape cartridge storage cells. Referring to FIG. 4, an array 201 of magnetic tape cartridge storage cells is illustrated. The array 201 of tape cartridge storage cells has a radius of curvature adapted to be mounted in the internal cylindrical array 201 of library module 111. The tape cartridge storage cells on the external cylindrical array 202 are formed with an opposite curvature than those on the internal cylindrical array wall 201. All of the tape cartridge storage cells in the internal 201 and external 202 cylindrical arrays face each other so that the robot arm 230 can retrieve and replace the magnetic tape cartridges from either the interior 201 or the external 202 cylindrical array.

Each tape cartridge storage cell of arrays 201, 202 consist of a bottom portion 402, a back portion 404, and intervening wall segments 406. Bottom portion 402 of the tape cartridge storage cells is angled downward, front to back, so that a magnetic tape cartridge placed in the tape cartridge storage cell tends to slide along bottom portion 402 into the tape cartridge storage cell. The wall segments 406 are adapted for access by the wrist and finger assemblies 240 of robot arm 230.

Attachment means such as tabs 408, formed at the rear of the arrays 201, 202 can be used to suspend the arrays 201, 202 from the wall segments 221, 231 of library module 111.

The arrangement of tape cartridge storage cells is illustrated more clearly in FIG. 3 wherein the external cylindrical array 202 is illustrated along the periphery of library module 111. The internal cylindrical array 201 of tape cartridge storage cells is illustrated as comprising two separate segments or regions of cell arrays. A cell array segment 302 of the internal cylindrical array 201 is mounted on the lower portion 308 of inner wall 204. An upper cell array segment 301 is mounted on the upper portion 306 of inner wall 204. In this fashion, an aperture is provided between the upper cell array segment 301 and lower cell array segment 302 of the internal cylindrical array 201 so that robot arm 230 can rotate about the center pivot axis A without interfering with any of the tape cartridge storage cells in the internal cylindrical array 201.

C. Tape Drive Unit

The magnetic tape cartridges retrieved from the individual tape cartridge storage cells are typically loaded onto media drive systems 141, 142 so that the data contained on the magnetic tape stored in the magnetic tape cartridge can be read by host computer 101. FIGS. 1 and 2 illustrate the placement of two media drive systems 141, 142 on library module 111. The media drive systems are shown attached to two of the twelve exterior walls 202 of library module 111. Within each media drive system is located a plurality of individual tape drives 211, 313 which function to read data from the magnetic tape cartridges loaded therein. FIG. 2 illustrates a single tape drive 211 and its associated stack loader 221. Tape drive 211 and stack loader 221 are located in the media drive system 141 to illustrate the orientation with respect to robot arm 230 and cylindrical arrays 201, 202 of tape cartridge storage cells. A segment of the tape cartridge storage cells is removed from outer cylindrical array 202. This provides an aperture through which the front loading door opening of stack loader 221 protrudes. It protrudes a sufficient distance so as to be lined up with the surrounding storage cell arrays. The robot arm 230 can thereby load or unload a magnetic tape cartridge into stack loader 221 with the same or similar range of motion as the replacement of a magnetic tape cartridge into one of the individual storage cells in the tape cartridge storage cell arrays.

A side view of media drive system 141 is shown in FIG. 3 wherein two of the tape drives 211, 313 and their associated stack loaders 221, 320 are shown stacked one above the other in a vertical alignment within media drive system 141 illustrated in FIG. 2. The orientation of the stack loaders 221, 320 and their respective tape drives 211, 313 is such that a magnetic tape cartridge is placed into the stack loader on an angle similar to that of the individual tape cartridge storage cells. The only difference is that the stack loaders 221, 320 require a horizontal loading of the magnetic tape cartridge while the tape cartridge storage cells store the magnetic tape cartridges in a vertical alignment. Thus the robot arm 230 in retrieving a magnetic tape cartridge from an individual tape cartridge storage cell and loading it into a media drive system 141 must rotate the magnetic tape cartridge through a 90° angle for proper orientation for loading into the tape drives 211, 313.

D. Robot Arm Assembly

1. Robotic Arm

Figure 5:
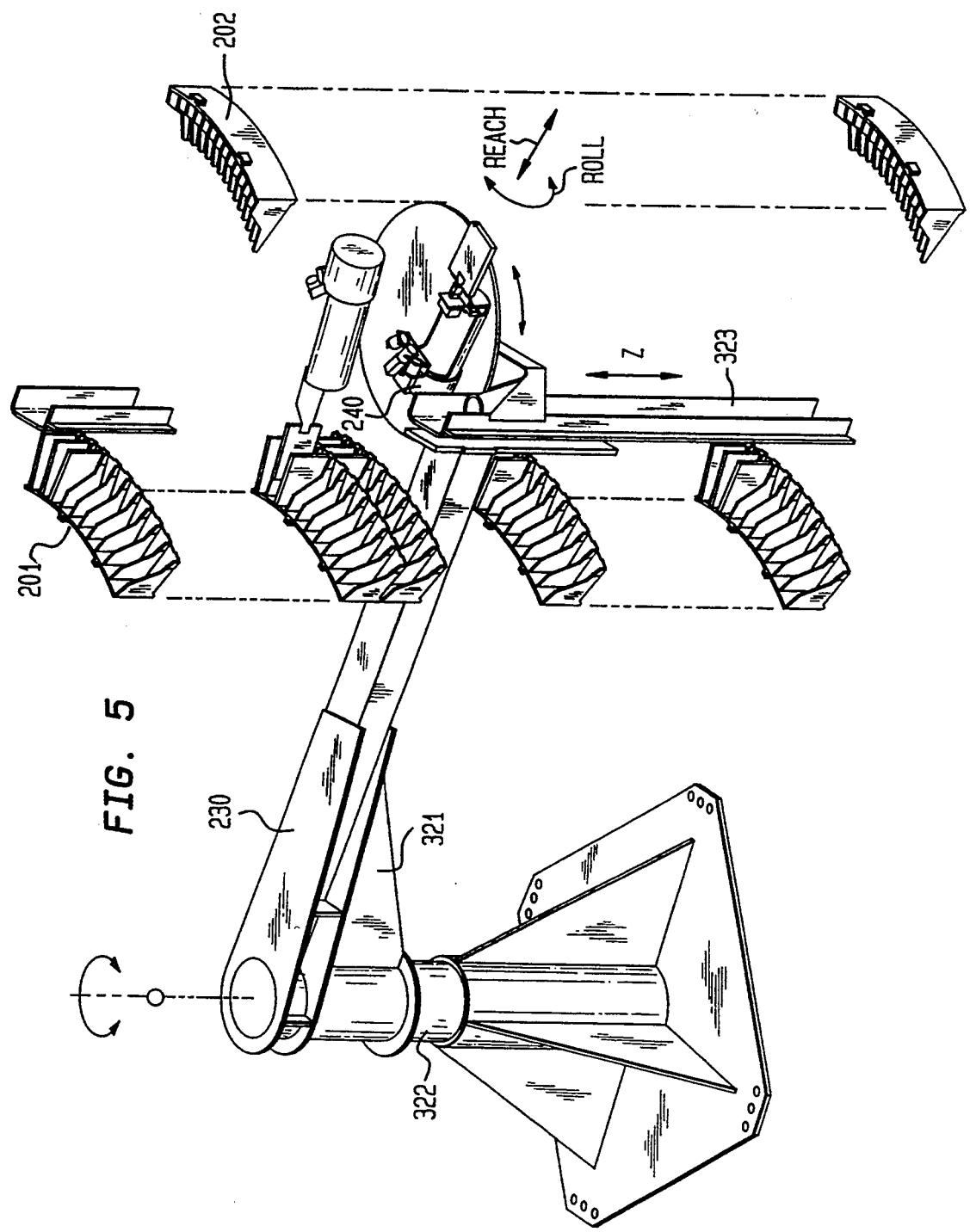
FIG. 5 is a perspective view of the robotic arm assembly.

FIGS. 2, 3 and 5 illustrate a top view, side view, and perspective view of the robot arm assembly 230 of library module 111. Robot arm assembly 230 consists of a plurality of cooperating mechanisms which provide a moveable arm for retrieving magnetic tape cartridges from their individual storage cells. The robot arm assembly 230 consists of a theta arm 321 rotatably mounted on a support column 322 which is attached to the floor plates 312 of library module 111. The robot arm assembly 230 includes a Z-mechanism 323 attached to the end of theta arm 321 remote from support column 322. The Z-mechanism 323 has coupled thereto a wrist and finger assembly 240 which performs the magnetic tape cartridge retrieval and replace functions with the storage cells and stack loaders. The Z-mechanism 323 provides a vertical range of motion for the wrist and finger assembly 240 to access various vertical levels (rows) of the tape cartridge storage cell arrays. Theta arm 321 locates the Z-mechanism 323 and its associated wrist and finger assembly 240 in the proper location (column) to access the tape cartridge storage cells. The robot arm support column 322 includes a motor (not shown) which causes theta arm 321 of the robot arm assembly 230 to rotate about the pivot point A of the robot arm assembly 230 so that the robot arm assembly 230 can access all of the tape cartridge storage cells which are located in a circular array about the pivot point A. Thus, the elements in the robot arm assembly 230 cooperatively operate to access each and every storage cell in the entire library module 111. The servo motors (not shown) controlling each of the various ranges of motion associated with elements in the robot arm assembly 230 are all controlled by library control unit 122 connected to library module 111. The robot arm assembly 230 is capable of accessing each of the approximately 6,000 tape cartridge storage cells in library module 111.

2. Wrist and Finger Assembly

Figure 6:
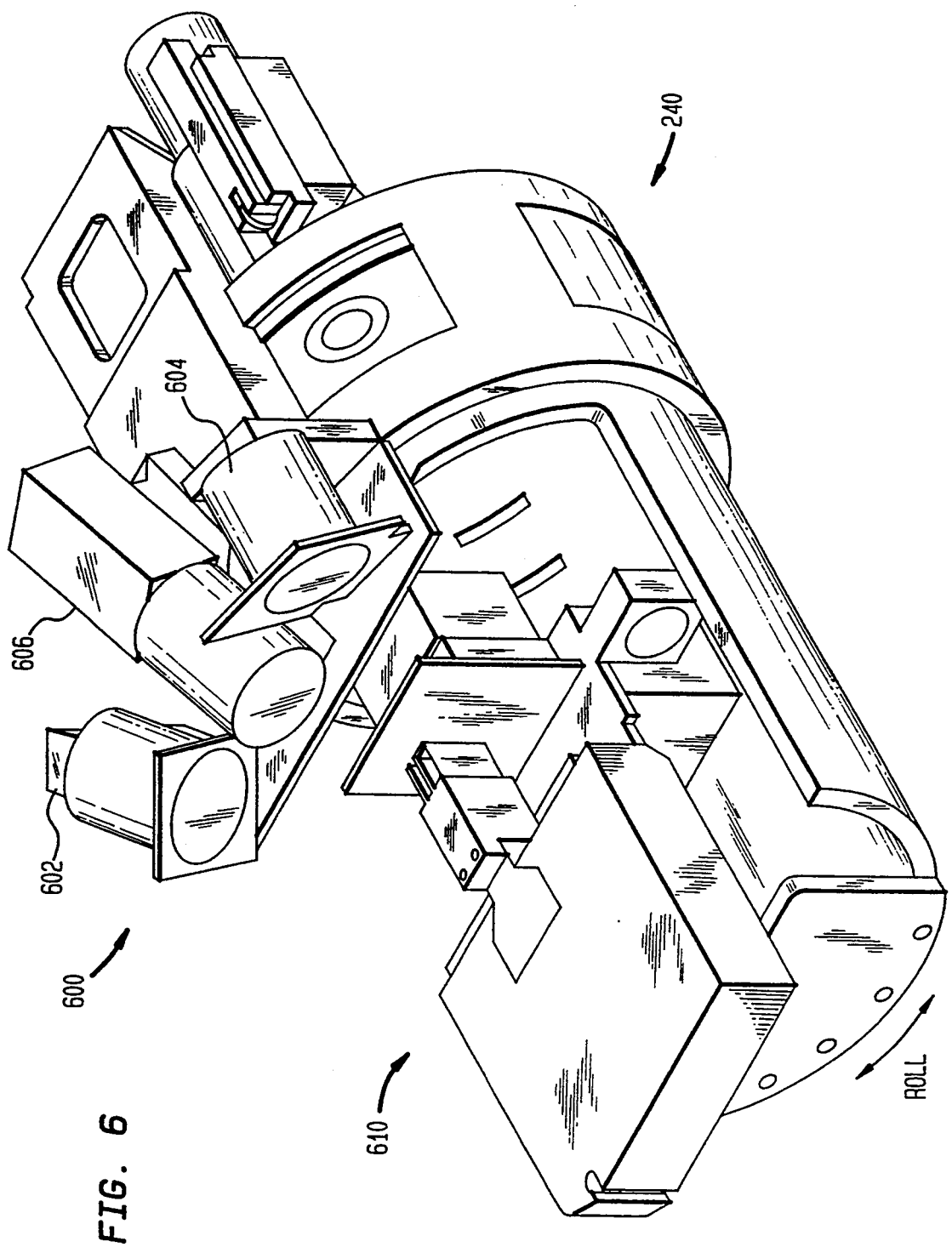
FIG. 6 is a perspective view of the robotic arm wrist and finger assembly.

FIG. 6 illustrates the wrist and finger assembly 240 that is located at the end of theta arm 321. The wrist and finger assembly 240 consists of a plurality of mechanisms that perform the roll and reach functions for the robot arm assembly 230. The magnetic tape cartridge can be rotated through a full 360 degree rotation about the pick-and-place axis X by a roll mechanism which implements the wrist function. The magnetic tape cartridge may also be rotated about the Z-axis to access the inner cell array 201 and outer cell array 202 as shown in FIG. 5.

3. Vision System

A vision system 600 is located on top of the wrist and finger assembly 240 and is focused at a predetermined distance in front of the wrist and finger assembly 240. The point of focus of vision element 606 coincides with the position of a machine readable label on the end of the magnetic tape cartridge stored in the magnetic tape cartridge storage cell. In order to enable vision element 606 to read the label on the magnetic tape cartridge, a source of illumination is provided. The source of illumination consists of a pair of lamps 602, 604 arranged one on either side of the vision element 606 and aligned in substantially the same orientation as vision element 606. The lamps 602, 604 are directed so that the light beams emanating from these two lamps cross at a point in the line of sight of the vision elements 606, which point coincides with the location of the label on the end of the magnetic tape cartridge.

The two lamps 602, 604 serve to illuminate the label on the magnetic tape cartridge sufficiently so that vision element 606 can accurately read the machine readable characters on the label. The vision system 600 is also used for the purpose of calibrating the alignment of telescopic pick-and-place mechanism 700 and the tape cartridge storage cells. A calibration system used in conjunction with the present invention is described in U.S. Pat. No. 4,908,777 to Wolfe, herein incorporated by reference in its entirety. Another calibration system used in conjunction with the present invention is described in U.S. Pat. No. 5,034,904 to Moy, herein incorporated by reference in its entirety.

4. Telescopic Pick-And-Place Mechanism

The telescopic pick-and-place mechanism 610 is mounted to the wrist and finger assembly 240. The telescopic pick-and-place mechanism 610 is designed to extend from the wrist and finger assembly 240 to reach the magnetic tape cartridge stored in the tape cartridge storage cell or tape drive device, grasp the magnetic tape cartridge, and retrieve it from the storage cell or tape drive device. Pick-and-place mechanism 610 also performs the reverse function of depositing the magnetic tape cartridge into the storage cell or tape reading device.

III. Buffered Access System

Figure 7:
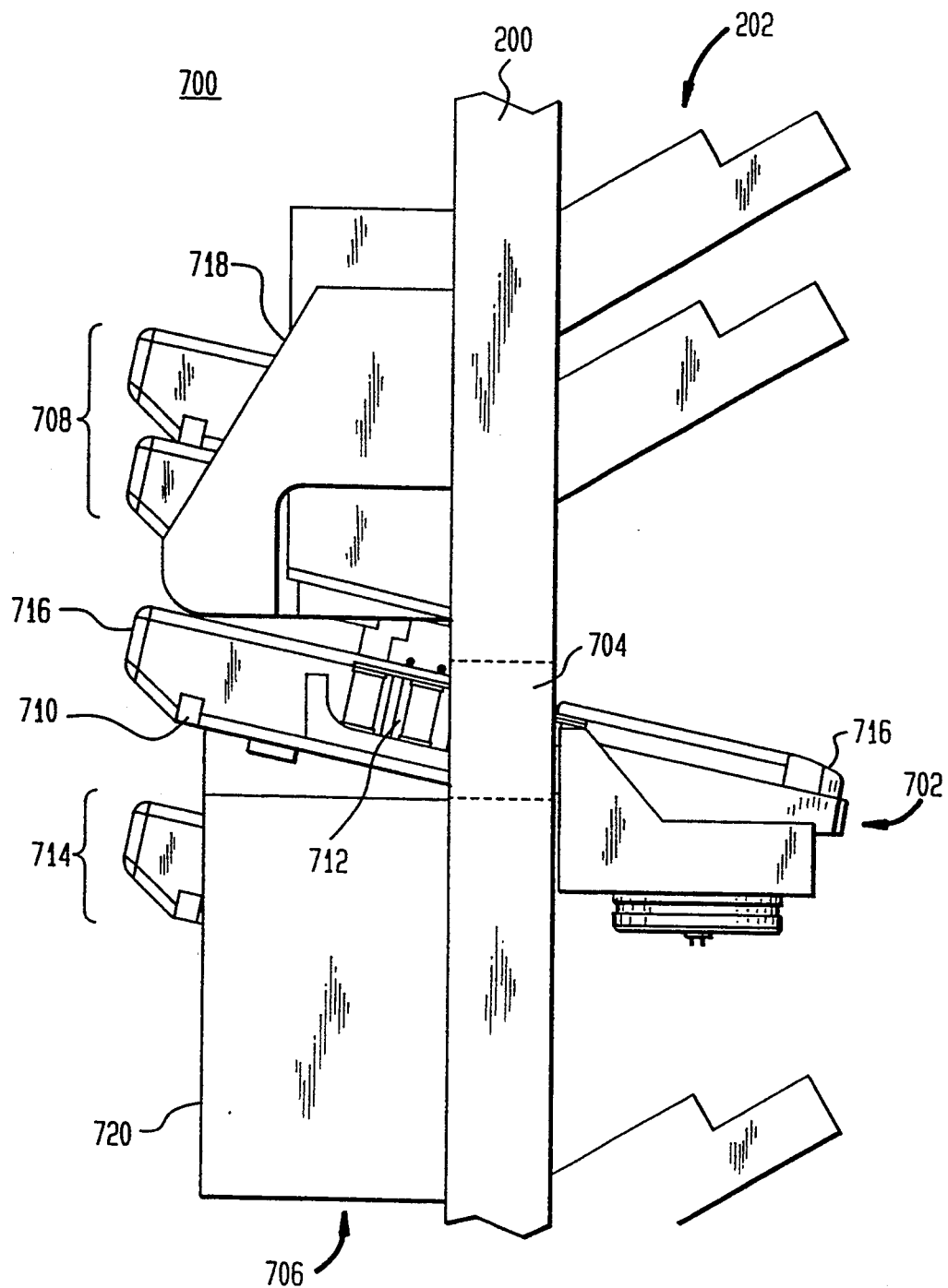
FIG. 7 is an side perspective view of the buffered access system of the present invention.

Referring to FIG. 7, a side perspective view of the exterior wall 200 implementing the buffered access system 700 of the present invention is illustrated. The buffered access system 700 is comprised of three main components: turntable mechanism 702, cartridge access port 704, and automatic stack loader 706. The library module wall segment which contains the buffered access system 700 also contains the exterior cylindrical array 202 of magnetic tape cartridge storage cells.

In the discussion below, reference to a single buffered access system 700 is discussed. However, in the preferred embodiment of the present invention, multiple buffered access systems 700 are implemented in a single library module. As one of skill in the relevant art will realize, any number of buffered access systems may be implemented in a library module to meet the needs of a particular application.

A. Automatic Stack Loader

Automatic stack loader 706 is attached to exterior of the library storage module external wall 200. Automatic stack loader 706 separates the magnetic tape cartridges loaded and unloaded from library storage module 111 into three categories: input stack 708, output stack 714, and transfer cartridge 716. The input stack 708 of magnetic tape cartridges are placed in the automatic stack loader input tray 718 for loading into the library storage module 111. The automatic stack loader 706 employs an indexing mechanism which lowers input stack 708 down one-cartridge width, placing the bottom-most magnetic tape cartridge of input stack 708 into feed tray 710. This cartridge is then driven by the tractor feed mechanism 712 from feed tray 710 to turntable mechanism 702.

When a data storage cartridge residing within the storage library is designated to be transferred out of the storage library, the robot arm mechanism 230 retrieves the cartridge from its storage cell, tape drive, or other device. The robot arm mechanism 230 then transfers the cartridge to turntable mechanism 702 where it is positioned so that automatic stack loader 706 can retrieve it. Tractor feed mechanism 712 is then brought into contact with the cartridge to pull it from turntable mechanism 702 onto feed tray 710. The cartridge is then transferred to the top of the output stack 714 of magnetic tape cartridges. Thus, the magnetic tape cartridge which is being transferred between the input stack 708 and a storage cell or other device within the storage library is referred to as transfer cartridge 716.

The automatic stack loader 706 used in the preferred embodiment of the present invention is described in U.S. Pat. No. 4,835,634 to Ostwald herein incorporated by reference in its entirety. However, implementation of other types of automatic stack loaders would be apparent to a person skilled in the relevant art.

B. Cartridge Access Port

A storage library implementing the present invention maintains the security and integrity of the system by preventing unauthorized access to the interior of the storage library. Physical access to the interior of the storage library is not required for loading and unloading data storage cartridges. Robotic arm mechanism 230 works in conjunction with buffered access system 700 to automatically transfer cartridges between the stack loader 706 and the storage cells, tape drives, or other devices within the storage library. To achieve a transfer, exterior wall 200 is configured with a cartridge access port (CAP) 704. Cartridge access port 704 is an opening in the exterior wall 200 through which a transfer cartridge 716 may be passed.

In addition to allowing automated tape insertion and retrieval, the cartridge access port 704 may be used to manually insert the transfer cartridge 716. Manual loading of data storage cartridges is required when the automatic stack loader 706 is inoperable and when a condition requiring immediate loading of a cartridge arises.

C. Turntable Mechanism

1. Location in Library Storage Module

Referring to FIG. 7, turntable mechanism 702 is illustrated among the cartridge storage cells of external cylindrical array 202. Turntable mechanism 702 extends the same distance from exterior wall 200 as the storage cells. Thus, the transfer cartridge 716 in turntable mechanism 702 is in the same vertical plane relative to pick-and-place assembly 610 as the cartridges in the storage cells.

FIG. 7 also illustrates the amount of space required to operate turntable mechanism 702. Typically, turntable mechanism 702 displaces approximately 4–6 storage cells. The lost storage capacity inside the storage library is compensated for by the storage capacity of automatic stack loader 706. In the preferred embodiment of the present invention, automatic stack loader 706 may hold as many as thirty cartridges in input tray 718 and thirty cartridges in the output tray 720. However, implementation of an automatic stack loader which is capable of holding more or less cartridges would be apparent to one skilled in the relevant art.

Turntable mechanism 702 holds transfer cartridge 716 in a horizontal position while the storage cells hold the cartridges in a vertical position. As described above, wrist and finger assembly 240 of robot arm mechanism 230 is capable of rotating around the pick-and-place axis A to retrieve and replace the magnetic tape cartridges from both, the storage cells and the turntable mechanism 702.

2. Turntable Mechanism Components

Figure 8:
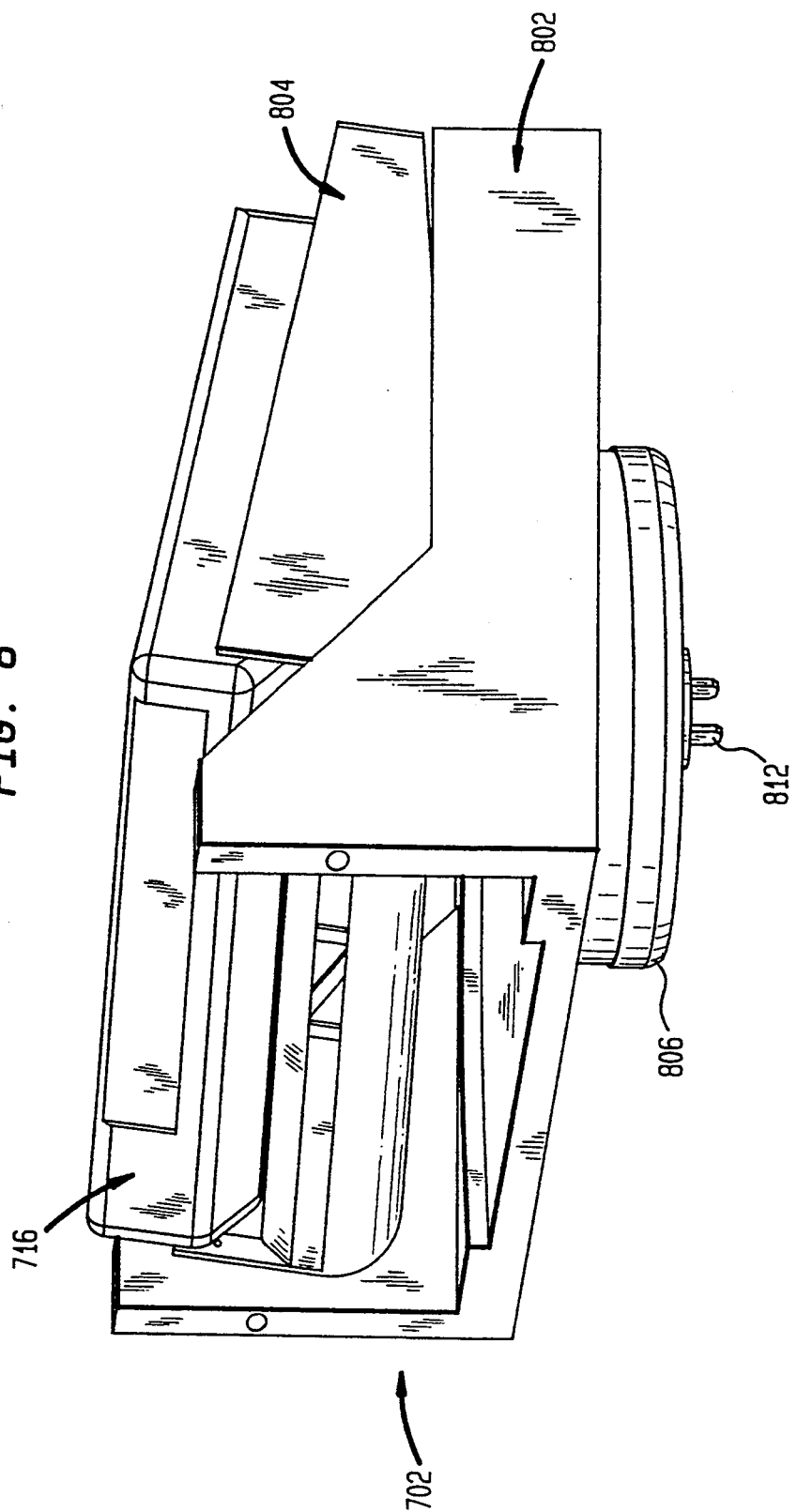
FIG. 8 is an isometric view of the turntable mechanism.

Referring to FIG. 8, an isometric view of the turntable mechanism 702 holding transfer cartridge 716 is illustrated. Turntable mechanism 702 consists of three main assemblies: turntable base 802, rotating platform 804, and servo motor 806.

Turntable base 802 is the means by which the rotating platform 804 and servo motor 806 are supported and secured to the storage library exterior wall 200. Turntable base 802 may take on any form which will support the weight of rotating platform 804, servo motor 806, and transfer cartridge 716. Turntable base 802 may a single bracket.

The rotating platform 804 is positioned at an angle similar to that of the storage cells of exterior cylindrical array 202. This will ensure that the transfer cartridge 716 which is placed on the turntable mechanism 702 slides smoothly and completely onto the rotating platform 804.

Figure 9:
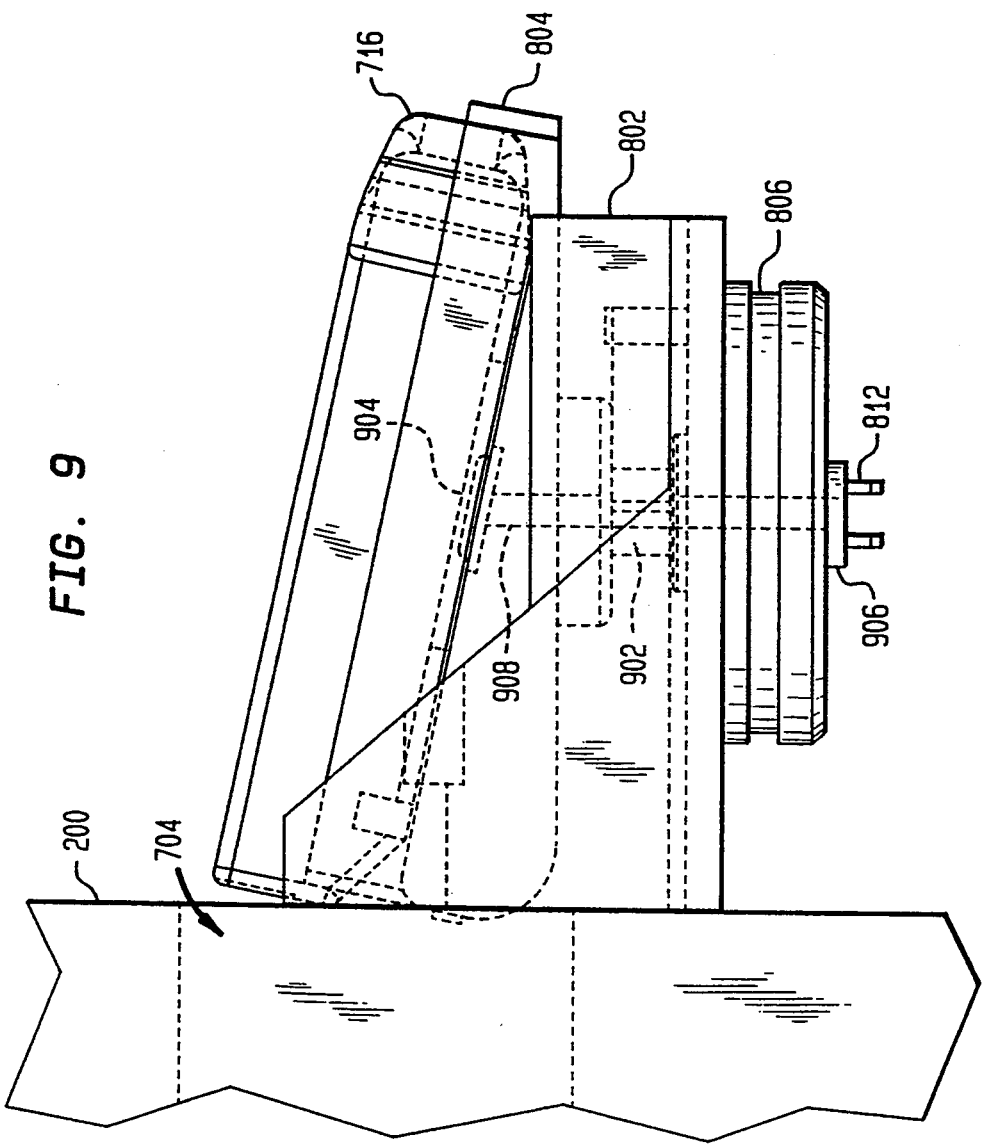
FIG. 9 is a cross-sectional side view of the turntable mechanism.

Referring to FIG. 9, a cross-sectional view of turntable mechanism 702 is illustrated. Servo motor 806 is positioned beneath the turntable base 802. Servo motor 806 is attached to and drives rotating platform 804 by the turntable drive spindle 902. The servo motor 806 is controlled by the library control unit 122. Library control unit 122 commands the servo motor 806 to position the rotating platform 804 in one of two positions: facing the automatic stack loader 706 or facing the robot arm mechanism 230. Library control unit 122 determines the desired position of the rotating platform 804 based on inputs received from the turntable mechanism 702, robot arm mechanism 230, and automatic stack loader 706.

Turntable mechanism 702 is also includes a sensor actuator 904 which actuates media present sensor 906 located beneath the servo motor 806 when transfer cartridge 716 is placed on rotating platform 804. Sensor actuator 904 actuates the media present sensor 906 through sensor actuator push rod 908. In the preferred embodiment of the present invention, sensor actuator 904, push rod 908, or media present sensor 906 are used to determine the presence and absence of transfer cartridge 716. However, implementation of other types of sensors, including optical, electrical, or other means would be apparent to one skilled in the relevant art.

Turntable mechanism 702 sends library control unit 122 information relating to its rotational position and the presence and absence of transfer cartridge 716. The library control unit 122 sends control signals to servo motor 806, commanding it to rotate the rotating platform 804 180° in a clockwise position from its position facing the automatic stack loader 706 to the robotic arm 240 or from the robotic arm 240 to the automatic stack loader 706. Likewise, automatic stack loader 706 is also connected to and controlled by the library control unit 122.

IV. Operation of Buffered Access System

When power is initially applied to buffered access system 700, the library control unit automatically commands the servo motor 806 to rotate the rotating platform 804. The servo motor 806 continues to drive the rotating platform until in reaches a preestablished initial position known to the library control unit 122. This position is referred to as the home position. Once the rotating platform reaches this position, the library control unit retains and controls its position.

A. Media Loading

Figure 10A:
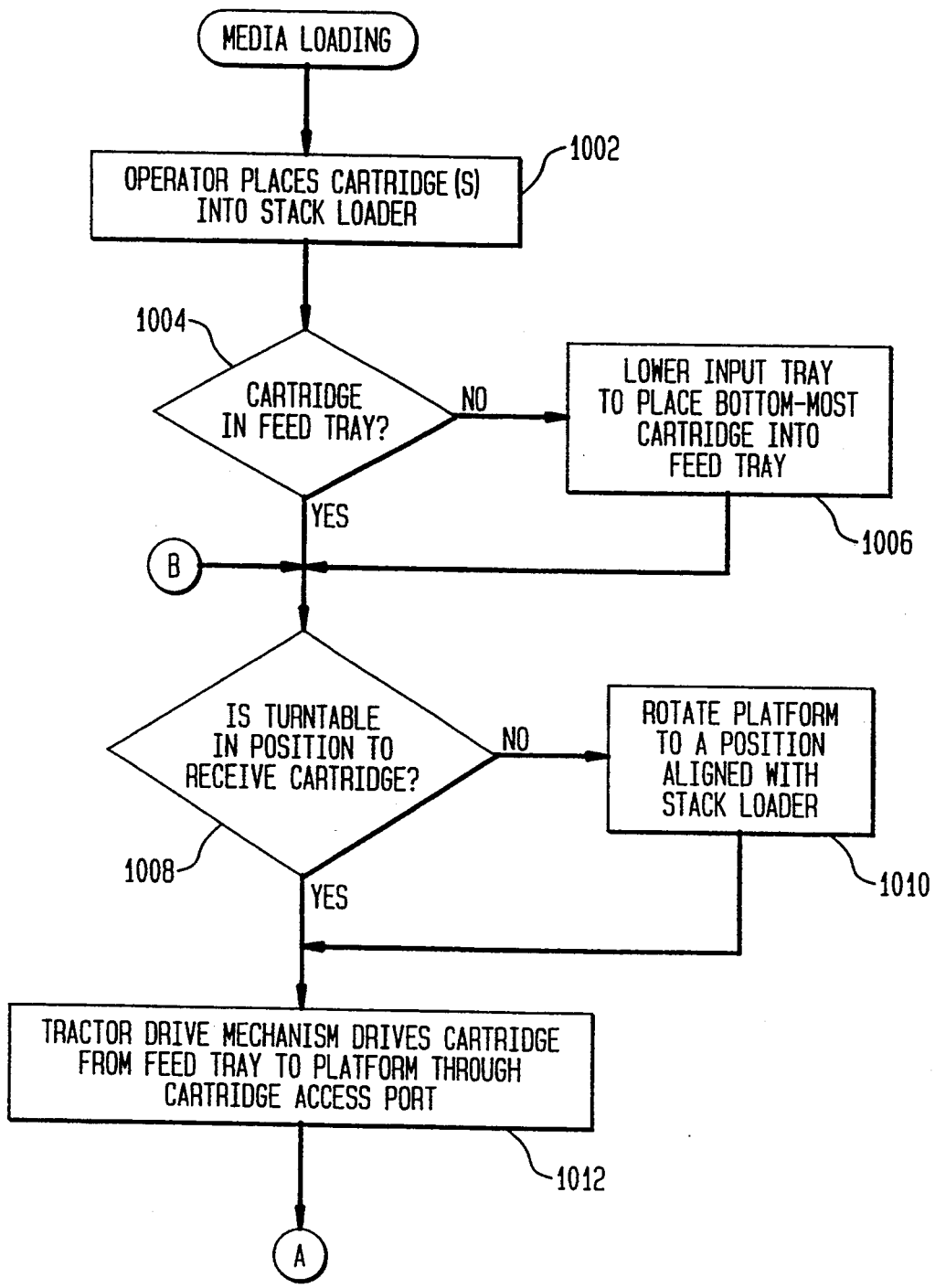
FIGS. 10A and 10B show a flowchart of the loading process of a magnetic tape cartridge in a library module using the buffered access system of the present invention.
Figure 10B:
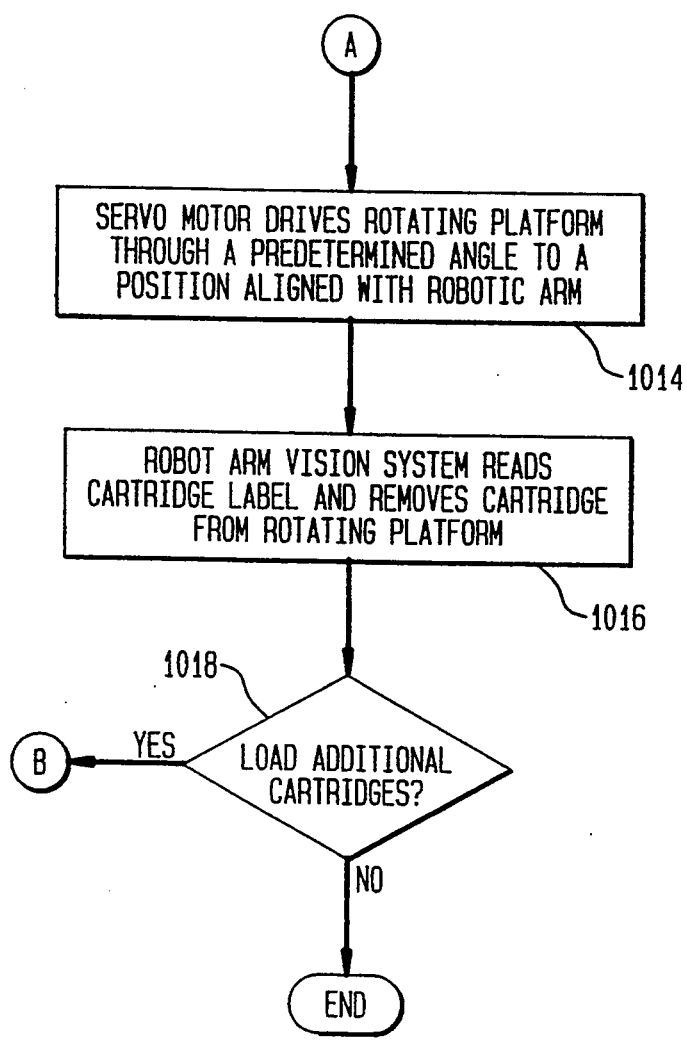

Referring to FIGS. 10A and 10B, a flowchart of the media loading process is illustrated. When loading the library storage module with one or more magnetic tape cartridges, an operator may place the cartridges directly onto the feed tray 710, the input tray 718, or on top of the input stack 708 in the automatic stack loader 706. This is illustrated in step 1002. When the cartridges are placed in the automatic stack loader 706, they are positioned such that the cartridge labels are facing outward toward the operator for viewing.

When the buffered access system 700 receives a command from the library control unit 122 to load a transfer cartridge 716, the automatic stack loader 706 first determines whether there is a transfer cartridge in its feed tray 710. This is illustrated in step 1004. If a transfer cartridge 716 is not present in its feed tray 710, then in step 1006, the automatic stack loader 706 lowers its input tray 718 and places the bottom-most magnetic tape cartridge of input stack 708 into feed tray 710. If a transfer cartridge 716 is present in its feed tray 710, then processing continues with step 1008.

To receive a transfer cartridge 716 from the automatic stack loader 706, rotating platform 804 must be aligned with the automatic stack loader 706. In step 1008, the library control unit determines if the rotating platform 804 is in the proper position. If not, then in step 101, the library control unit 122 commands the servo motor 806 to rotate the rotating platform 804 to face the automatic stack loader 706. If the rotating platform is in the proper position, then processing continues with step 1012.

In step 1012, once the feed tray 710 is holding a transfer cartridge 716, the tractor mechanism 712 is energized to drive the transfer cartridge 716 out of the feed tray 710 through the cartridge access port 704 and into the rotated platform 804. When transfer cartridge 716 is positioned in rotating platform 804, it actuates the sensor actuator 904 which in turn activates the media present sensor 906 via the sensor actuator push-rod 908. When the library control unit 122 receives the output signal indicating that the transfer cartridge 716 is positioned in the rotating platform 804, the library control unit then commands the tractor mechanism 712 to return to its home position and de-energize.

In step 1014, the rotating platform 804 is then driven by servo motor 806 and spindle 902 through a predetermined angle to be aligned with the robot arm mechanism 230 inside the library storage module 111. In step 1016, the servo motor 806 holds the rotating platform 804 in a stationary position while the visual system 600 of robot arm assembly 230 reads the label on the transfer cartridge 716 and removes it from the rotating platform 804 and places it in the designated storage cell or device. When the media present sensor 906 receives the indication that the transfer cartridge 716 has been removed from rotating platform 804, it sends this information to the library control unit 122 which then determines whether there is another transfer cartridge 716 required to be loaded in step 1018. If so, then the above process is repeated starting at step 1008 for the next transfer cartridge 716. If not, then the media loading process ends.

B. Media Unloading

Figure 11A:
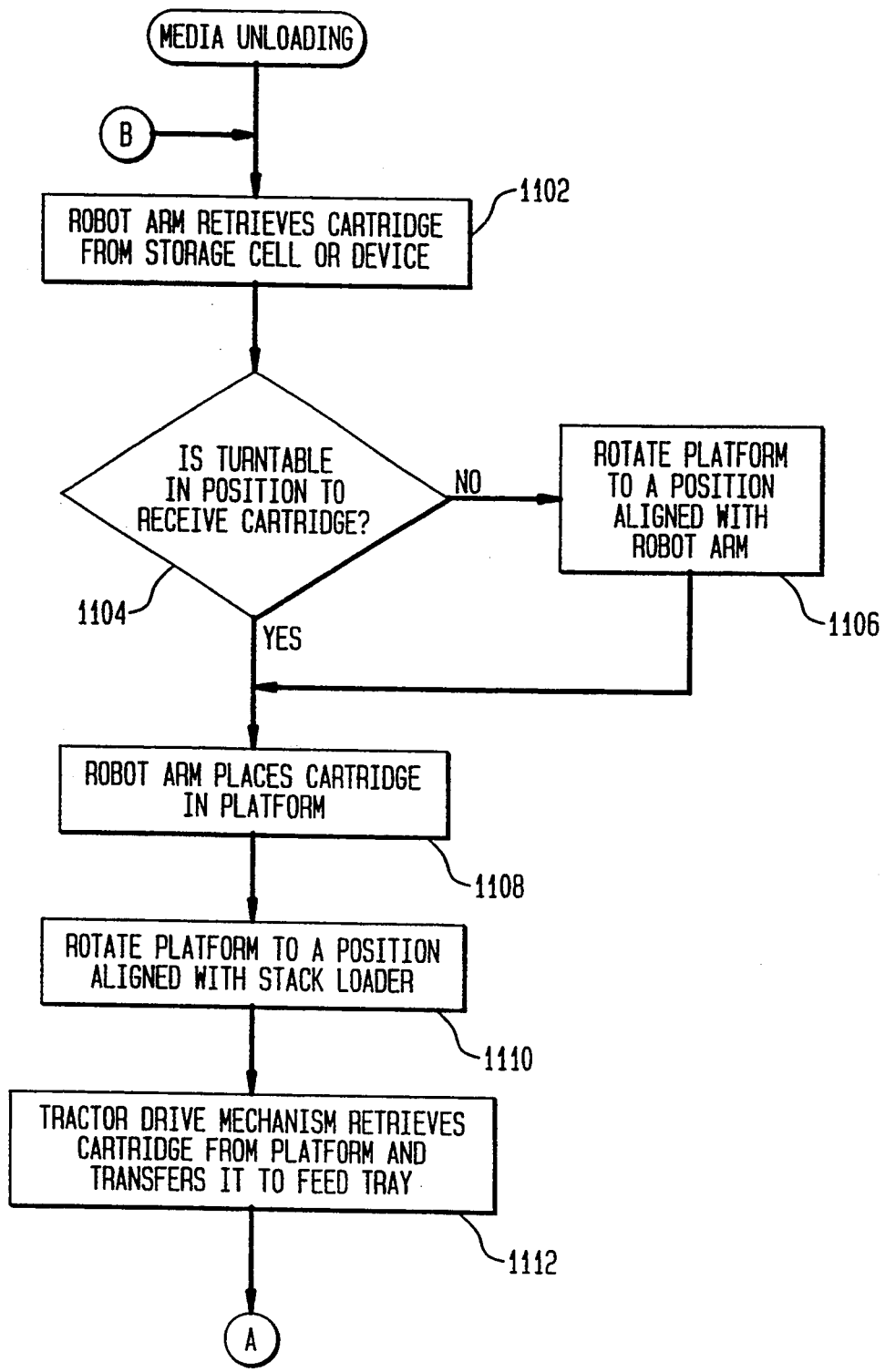
FIGS. 11A and 11B show a flowchart of the unloading process of a magnetic tape cartridge in a library module using the buffered access system of the present invention.
Figure 11B:
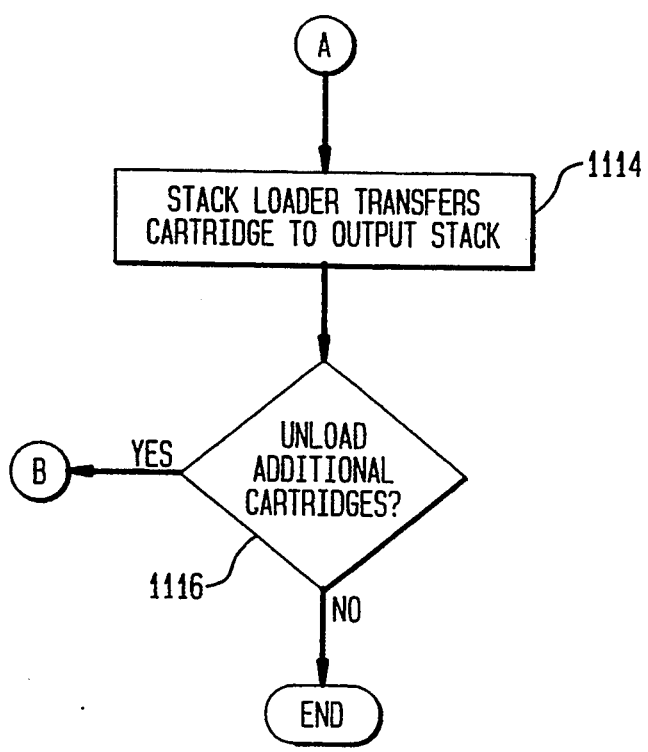

Referring to FIGS. 11A and 11B, a flowchart of the media unloading process is illustrated. First, in step 1102, the robot arm retrieves a transfer cartridge 716 from a storage cell or other device. In step 1104 the library control unit 122 determines if the rotating platform is in the proper position to receive the transfer cartridge from the robot arm mechanism 230. If the rotating platform 804 is not in the proper position to receive the cartridge from the robot arm, the in step 1106 the library control unit 122 commands the servo motor 906 to rotate the rotating platform 804 through a predetermined angle to be aligned with the robot arm assembly 240. If the rotating platform is in the proper position, then processing continues at step 1108.

In step 1108, the servo motor 806 holds the rotating platform 804 in a stationary position while the robot arm mechanism 230 places the transfer cartridge 716 on rotating platform 804. This will actuate the sensor actuator 904 which activates the media present sensor 906. The media present sensor 906 sends this indication to library control unit 122. In step 1110, the servo motor 806 is commanded by the library control unit 122 to drive the rotating platform 804 to a position aligned with the automatic stack loader 706. Next, in step 1112, the tractor drive mechanism 712 pulls the transfer cartridge 716 from the rotating platform 804 and places it in feed tray 710.

In step 1114, automatic stack loader 706 places the transfer cartridge 716 on top of the output stack 706. Once the library control unit 122 is notified that the transfer of transfer cartridge 716 is complete, it determines that another transfer cartridge 716 in step 1116. If so, then the above process is repeated, starting at step 1102. If not, then the unload cycle is complete and the process ends.

While various embodiments of the present invention have been described above, it should be understood that they have been presented by way of example, and not limitation. Thus, the breadth and scope of the present invention should not be limited by any of the above-described exemplary embodiments, which should be defined only in accordance with the following claims and their equivalence.

What is claimed is:

1. An automated library system for storing data using a plurality of data storage cartridges, the system comprising:
   a housing defining an interior cartridge storage area;
   a plurality of cartridge storage cells disposed within said storage area, each of said cartridge storage cells configured to store a data storage cartridge;
   buffer means for automatically transferring a selected cartridge between said interior storage area and a point outside said housing, said buffer means having an opening in said housing and a turntable mechanism disposed within said storage area proximate to said opening; and
   robot means disposed within said storage area for transporting said selected cartridge between said buffer means and one of said plurality of cartridge storage cells.

2. The system of claim 1, wherein said buffer means further comprises:
   a stack loader coupled to an exterior of said housing proximate to said opening.

3. The system of claim 2, wherein said stack loader comprises:
   receiving means for receiving and holding a stack of cartridges; and
   transport means for transporting a selected cartridge between said turntable mechanism and said receiving means through said opening in said housing.

4. The system of claim 3, wherein said turntable mechanism comprises:
   a rotating platform configured to perform one of the following,
      receive a selected cartridge from said transport means, rotate said selected cartridge and provide said selected cartridge to said robot means, and
      receive a selected cartridge from said robot means, rotate said selected cartridge and provide said selected cartridge to said transport means.

5. The system of claim 4, further comprising:
   controller means for controlling the operation of said buffer means.

6. The system of claim 3, wherein said stack of cartridges comprises an input stack of cartridges and wherein said receiving means comprises:
   a first receiving means positioned above said transport means, for receiving said input stack of cartridges and for sequentially providing the bottom-most cartridge of said input stack of cartridges to said transport means.

7. The system of claim 6, wherein said stack of cartridges further comprises an output stack of cartridges and wherein said receiving means further comprises:
   a second receiving means located adjacent to said transport means, for receiving said selected cartridge from said transport means and for placing said selected cartridge in said output stack of cartridges.

8. The system of claim 4, wherein said turntable mechanism further comprises:
   drive means for rotating said rotating platform.

9. The system of claim 8, wherein said drive means is a servo motor.

10. The system of claim 5, wherein said stack loader, said turntable mechanism, and said robot means are responsive to said controller means.

11. The system of claim 7, wherein said turntable mechanism comprises:
   a rotating platform configured to perform one of the following,
      receive a selected cartridge from said transport means, rotate said selected cartridge and provide said selected cartridge to said robot means, and
      receive a selected cartridge from said robot means, rotate said selected cartridge and provide said selected cartridge to said transport means.

12. The system of claim 11, further comprising:
   controller means for controlling the operation of said buffer means.

13. The system of claim 12, wherein said turntable mechanism further comprises:
   drive means for rotating said rotating platform.

14. In an automated storage library system having an enclosed housing defining an interior cartridge storage area having a plurality of cartridge storage cells for holding data storage cartridges and having a robot mechanism for transporting a selected data storage cartridge within the storage area, a buffered access system for automatically transferring a selected data storage cartridge between the interior cartridge storage area and a point outside the automated storage library system, the buffered access system comprising:

an opening in the housing;

a stack loader coupled to an exterior of the housing proximate to said opening; and a turntable mechanism disposed within the storage area proximate to said opening.

15. The system of claim 14, further comprising:

controller means for controlling said stack loader, said turntable mechanism, and the robot mechanism.

16. The system of claim 15, wherein said stack loader comprises:

receiving means for receiving and holding a stack of cartridges.

17. The system of claim 16, wherein said stack loader further comprises:

transport means for transporting a selected cartridge between said turntable mechanism and said receiving means through said opening in said housing.

18. The system of claim 17, wherein said turntable mechanism comprises:

a rotating platform configured to perform one of the following, receive a selected cartridge from said transport means, rotate said selected cartridge and provide said selected cartridge to the robot mechanism, and receive a selected cartridge from the robot mechanism, rotate said selected cartridge and provide said selected cartridge to said transport means.

19. The system of claim 18, wherein said stack of cartridges comprises an input stack of cartridges and an output stack of cartridges, and wherein said receiving means comprises:

first receiving means positioned above said transport means, for receiving said input stack of cartridges and for sequentially providing the bottom-most cartridge of said input stack of cartridges to said transport means; and second receiving means located adjacent to said transport means, for receiving said selected cartridge from said transport means and for placing said selected cartridge in said output stack of cartridges.

20. In an automated storage library system having an enclosed housing defining an interior cartridge storage area having a plurality of cartridge storage cells for holding data storage cartridges and having a robot mechanism for transporting a selected data storage cartridge within the storage area, a buffered access system for automatically transferring a selected data storage cartridge between the interior cartridge storage area and a point outside the automated storage library system, the buffered access system comprising:

an opening in the housing;

a stack loader, coupled to an exterior of the housing proximate to said opening, said stack loader including first receiving means for receiving and holding an input stack of cartridges, second receiving means for receiving and holding an output stack of cartridges, and transport means for transporting a selected cartridge between the storage area and said first and second receiving means through said opening in the housing;

a turntable mechanism, disposed within the storage area proximate to the opening, said turntable mechanism including a rotating platform configured to receive a selected cartridge from said transport means, rotate said selected cartridge and provide said selected cartridge to the robot mechanism, and to receive a selected cartridge from the robot mechanism, rotate said selected cartridge and provide said selected cartridge to said transport means, and drive means for rotating said rotating platform; and controller means for controlling said stack loader, said turntable mechanism, and the robot mechanism.

* * * * *